(12) United States Patent
Birkestrand et al.

(10) Patent No.: US 6,690,127 B2
(45) Date of Patent: Feb. 10, 2004

(54) ELECTRONIC THROTTLE/BRAKE CONTROL SYSTEM FOR MOTORIZED WHEEL HUB

(76) Inventors: Orville J. Birkestrand, 1435 Jersey Ridge Rd., Davenport, IA (US) 52803; William A. Peterson, 2629 Pinebluff Dr., Vestal, NY (US) 13850

( * ) Notice: Subject to any disclaimer, the term of this patent is extended or adjusted under 35 U.S.C. 154(b) by 67 days.

(21) Appl. No.: 10/059,725

(22) Filed: Jan. 29, 2002

(65) Prior Publication Data

US 2002/0135330 A1 Sep. 26, 2002

Related U.S. Application Data

(63) Continuation of application No. 09/707,788, filed on Nov. 7, 2000, now Pat. No. 6,342,769.

(51) Int. Cl.[7] .................................................. H02P 1/00
(52) U.S. Cl. .............................. 318/139; 318/9; 318/14; 318/254; 318/138; 318/439
(58) Field of Search ............................ 318/139, 9, 14, 318/254, 138, 439, 515, 528, 501, 375, 376; 388/824, 81, 827, 829, 840

(56) References Cited

U.S. PATENT DOCUMENTS

| | | | |
|---|---|---|---|
| 4,903,188 A | * | 2/1990 | Madhavan et al. ............ 363/96 |
| 5,451,832 A | | 9/1995 | Cameron et al. |
| 5,528,721 A | * | 6/1996 | Searcy et al. ................ 388/824 |
| 5,737,144 A | * | 4/1998 | Ataee et al. ................... 360/75 |
| 6,034,493 A | | 3/2000 | Boyd et al. |

\* cited by examiner

*Primary Examiner*—Karen Masih
(74) *Attorney, Agent, or Firm*—Cesari and McKenna, LLP

(57) ABSTRACT

An electronic motor control system includes a brushless DC machine having an armature and a stator with at least three phase windings, a commutation circuit including a DC power supply and switching devices associated with the windings to supply current two selected pairs of the windings and anti-parallel unidirectional current devices which provide current paths to dissipate energy stored in each windings after the supply of current through the associated switching device has terminated, a programmable commutation logic circuit responsive to the current signals in the windings for providing switching signals to the commutation circuit to cause rotation of the armature, a current sensor in circuit with the power supply for sensing the supply current and producing current signals, a controller responsive to the current signals, an additional unidirectional current device connected between each winding and the power supply, the direction of conduction therethrough being opposite to that of the first-mentioned unidirectional current devices and a switch for interrupting the connection between the additional unidirectional current devices and the power supply.

14 Claims, 8 Drawing Sheets

| R1 | R2 | R3 | R4 | R5 | R6 | R7 | R8 | R9 | R10 | Pullup |
|---|---|---|---|---|---|---|---|---|---|---|
| 100 | 200 | 400 | 800 | 1600 | 3200 | 6400 | 12800 | 25600 | 51200 | 3100 |

| Grounded Wiper | |
|---|---|
| Command | Voltage |
| -5 | 0 |
| -4 | 0.15625 |
| -3 | 0.441176 |
| -2 | 0.921053 |
| -1 | 1.630435 |
| null | 2.5 |
| +1 | 3.351064 |
| +2 | 4.018967 |
| +3 | 4.458042 |
| +4 | 4.714022 |
| +5 | 4.852941 |

ELECTRONIC THROTTLE/BRAKE CONTROL SYSTEM FOR MOTORIZED WHEEL HUB

RELATED APPLICATION

This application is a continuation of Ser. No. 09/707,788, filed Nov. 7, 2000, now U.S. Pat. No. 6,342,769.

BACKGROUND OF THE INVENTION

This application relates to an electronic control system. It relates especially to a throttle/brake control system for a motorized wheel hub.

There are numerous vehicles in use today which have battery-powered electric motors to drive the wheels of the vehicle. These include bicycles, adult tricycles, wheelchairs, motor scooters, golf carts, all terrain vehicles, etc. In many such vehicles, the electric motor is mounted to the vehicle frame with the motor output being coupled to the wheels by way of a chain drive, gear train or the like. More preferably, the motor is incorporated right into the wheel hub thereby minimizing the size, weight, complexity and cost of the drive system. Examples of such in-hub motors are disclosed in U.S. Pat. Nos. 572,036; 2,514,460 and 3,921,741.

A particularly desirable, modular motorized wheel hub assembly for vehicles of this type is disclosed in U.S. Pat. No. 6,100,615, the contents of which is hereby incorporated herein by reference.

With modular motorized wheels of the type of interest here, it is essential that suitable control means be provided which are capable of applying the appropriate control voltages to the wheel motor to enable the wheel motor to operate in a reliable fashion. Invariably, such control means include a hand or foot-operated throttle or throttle/brake control which the vehicle operator may manipulate to accelerate the decelerate the associated vehicle. For the most part, conventional electric motor controllers, particularly those used to control electric bicycles, golf carts and other electric vehicles operate satisfactorily. However, they do have certain disadvantages which limit their wider use and application. More particularly, some such controllers are complex and costly. Others require a large number of moving, contacting parts or brushes which are prone to wear thereby limiting the useful life of the controller. Others are not suitable for all-weather outdoor applications, such as required on bicycles and other vehicles.

Also, those prior controllers used to control brushless motors of the type disclosed in the above patents often do not allow the motor to operate in a regenerative braking mode or if they do, they require the use of the Hall sensors or the like to sense the angular position of the motor rotor to effect communication of the motor in all four operating quadrants. That is, since, synchronous DC motors and other permanent magnet machines are frequently used in applications where direct control of the torque applied to the load is required, it is desirable to provide four quadrant operation, with both positive and negative torque and speed in such applications; see FIG. 10.

When the machine is operating in quadrants one and three in FIG. 10, it is operating as a motor and energy is being transferred from the DC source to the load. During operation in quadrants two and four the machine is used as a generator, and energy is transferred from the mechanical load to the DC voltage source. The motor shaft torque for a rotary machine (or force for a linear machine) is proportional to the winding currents applied to the motor and the torque constant of the motor, assuming that the motor is properly commutated. Proper commutation is required to generate a magnetic field in the motor stator windings that produce the desired force when acting against the permanent magnet field of the rotor. This is normally accomplished by utilizing a rotor position sensor or sensors to tell inverter circuitry driving the motor when to commutate the current from winding to winding to maintain this relationship.

The most common implementation of this principle is with a three phase brushless DC motor such as shown at M in FIG. 11, wherein the rotor position is detected with Hall effect devices H placed to indicate the angular position of the magnetic field produced by the rotor. In such a system, the commutation logic L switches the drive current to three high side switches S and three low side switches S' in an inverter I to maintain the proper field relationship. The rotating field of the rotor produces a back electromotive field (EMF) or voltage in the motor stator windings W. The applied voltage must overcome this back EMF for current to flow in the direction to produce motoring torque. The back EMF is proportional to the speed of the rotor and when the back EMF is equal to the applied voltage, motoring current cannot be generated. This speed is referred to as "base speed". Operation is normally limited to speeds below base speed. With operation below base speed, the back EMF produced is, by definition, less than the applied DC voltage. Operation of the machine as a generator, where mechanical energy is supplied to the DC source, requires that the back EMF voltage be boosted to a value at least equal to the applied voltage. This is normally accomplished by applying a voltage to the motor in the inverse polarity to the direction of rotation. This inverse commutation causes the stator current to increase rapidly. The increased current stores energy in the leakage inductance of the stator windings that, when the commutation is returned, adds to the back EMF to produce a voltage, thereby allowing current to flow in the stator. The FIG. 11 circuit produces this effect and generates a torque in the motor M that is independent of the direction of rotor rotation, and it works in all four quadrants shown in FIG. 10. The commutation logic for the six switches S', of that circuit is shown in FIG. 12. An example of such a brushless DC motor control is described, for example, in U.S. Pat. No. 6,034,493.

The motor M in FIG. 11 is thus driven in a six step per cycle sequence. This sequence is reversed to produce torque in the opposite direction. When the machine is operated in quadrants two and four (FIG. 10), the current produced by conduction of the switches S in the direction opposite to the rotation produces a current ramp up in the leakage inductance required to boost the back EMF to the source voltage level. The source current is measured by a current sensor C and the polarity of it is reversed by a switchable 1/−1 amplifier A as a function of the direction of commutation. This arrangement maintains a unidirectional current in a hysteretic comparator H. The hysteresis in that comparator determines the frequency at which the commutation will be switched. The motor current is thus completely controlled, with the maximum and minimum being set by the hysteretic comparator H.

The circuit in FIG. 11 requires that the position of the rotor field be known to the commutation logic L. The rotating field of the rotor induces a voltage in the stator windings W that can be detected and used to determine the rotor position as well. However, such a position sensing system has a problem with operation at stall and low speeds where the back EMF voltage produced by the motor rotor is insufficient. There are several known methods of sensing the back EMF to produce the commutation logic. These methods require sensing the field in the stator winding W that is not being driven to determine the rotor position. However, when the commutation field is reversed for second and fourth quadrant operation, this logic does not produce the required results. Thus, conventional motor drive circuits based on such sensorless commutation methods do not allow operation in the second and fourth quadrant shown in FIG. 10. Rather, sensorless braking is normally accomplished by shorting out the stator windings and allowing the motor current produced to dissipate in the winding resistance. This can produce excessive currents which cannot be controlled as they do not flow through the current sensor C, but circulate within the stator windings W. Additionally, energy input from a mechanical source, such as a pedal crank in the case of a bicycle, is not recovered, but is dissipated in the motor, potentially producing excessive motor temperatures.

Alternate methods of producing braking torque have been explored and examples of these methods are given in U.S. Pat. Nos. 5,451,832 and 5,793,168. Both of these known control techniques provide a braking torque, but do not return the mechanical energy to the DC source. For simple traction applications, the direction of rotation does not reverse, but the torque still needs to be very well controlled in the first and fourth quadrants shown in FIG. 10.

What is desired, then, is a control system to produce second and fourth quadrant regenerative braking without the need for position sensing and that recovers the mechanical energy in an efficient manner. Additionally, the regenerative torque needs to be well controlled, as it is in the known Hall sensor-type position sensing circuit in FIG. 11.

SUMMARY OF THE INVENTION

Accordingly, it is an object of the present invention to provide an electronic control system that is particularly suitable for controlling a motorized wheel hub.

Another object is to provide a system of this type which is rugged and reliable and is capable of operating outdoors in extreme weather conditions for a prolonged period.

A further object of the invention is to provide a hand-operated control for a motorized vehicle which is relatively easy and inexpensive to make and to assemble.

Still another object of the invention is to provide such a control which is relatively immune to outside electrical influences.

Another object of the invention is to provide a control incorporating a rotary member and which produces positive and negative control signals proportional to the angular deviation of that member from a home position and which can be used to control a variety of electrical loads.

A further object of the invention is to provide a reliable, long lasting variable voltage throttle/brake control for a brushless DC motor or similar machine.

Another object of this invention is to provide a reliable control for a brushless motor that has a minimum of necessary wires connected to the motor.

A further object of the invention is to provide a control system which is sufficiently small, lightweight and compact to fit on a bicycle or other small vehicle.

An additional object is to provide a control circuit for interfacing a hand or foot-operated rotary control to a brushless DC motor which circuit provides suitable control voltages to enable the motor to operate at varying speeds in both forward and reverse torques as determined by the position of the rotary control.

A further object is to provide a control system for controlling a brushless DC motor which allows the machine to operate in a regenerative braking mode without the need for sensing the position of the motor's rotor.

Yet another object of the invention is to provide such a control system that closely controls the regeneration torque developed by a DC machine.

Another object is to provide a system such as this which maintains full control of a brushless DC machine or AC synchronous machine when the machine is operating in both motoring and braking modes.

Yet another object is to provide such a system which controls the operation of a DC brushless motor at all speeds below base speed.

Still another object is to provide a hand-operated control system that can be mounted to standard bicycle without modifying the bicycle.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

Briefly, our control system comprises a throttle/brake control comprising a plurality of contact tracks connected to a voltage source by way of a resistor ladder and a wiper which together produce positive and negative electrical signals. The tracks and the wiper are mounted for relative movement so that when the wiper is moved schematically from a home position toward one end of the resistor ladder (or vice versa), the control produces proportional positive electrical signals and when the wiper is moved toward the opposite end of the ladder from that home position (or vice versa), the control produces proportional negative electrical signals.

In a preferred embodiment of the invention particularly suitable for mounting to the handlebars of a bicycle, the resistor ladder and contact tracks are fixed to a first annular member encircling a handlebar grip segment and the wiper is fixed to a second annular member coaxial to the first member, the two members being rotatable relatively about their common axis in one direction or the other to produce the aforesaid proportional positive and negative electrical signals. Because the control is wholly resistive, it is rugged and reliable and immune to outside electrical influences, yet it is relatively easy and inexpensive to make in quantity.

As we shall see, the signals from the throttle/brake control are applied to a special sensorless control circuit to be described in detail later that produces drive signals for a motorized wheel hub mounted to a bicycle or other vehicle so as to selectively propel and brake the bicycle or vehicle at various rates depending upon the relative position of the two members of the throttle/brake control. Power for the control system is provided by rechargeable batteries which, along with the aforesaid control circuit, comprise a compact power unit which may be mounted to the frame of a bicycle or other vehicle without requiring any modification to that frame.

BRIEF DESCRIPTION OF THE DRAWINGS

For a fuller understanding of the nature and objects of the invention, refer to the following detailed description taken in connection with the accompanying drawings, in which.

DETAILED DESCRIPTION OF AN ILLUSTRATIVE EMBODIMENT

Figure 1:
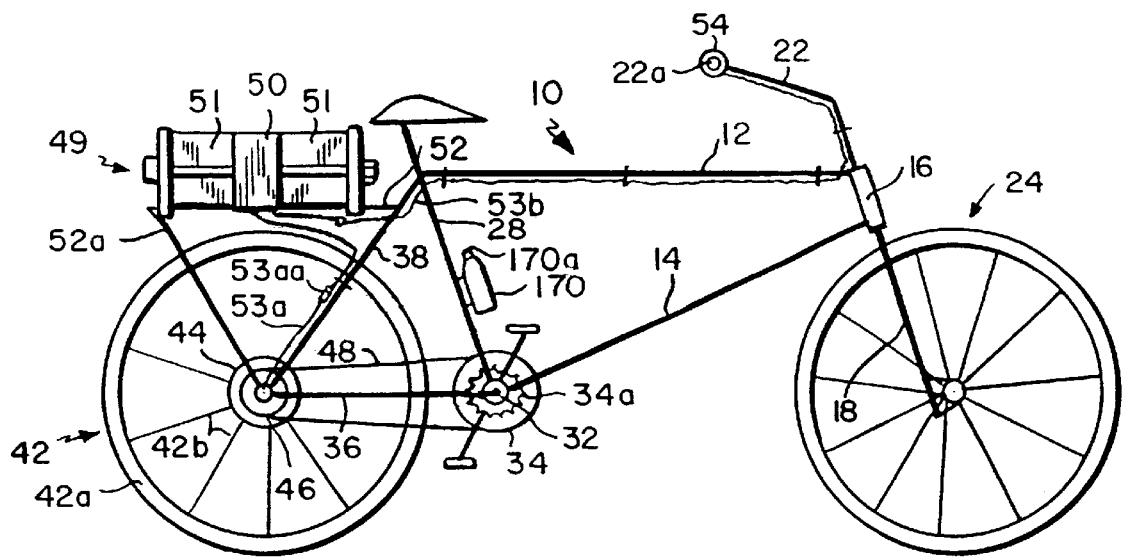
FIG. 1 is a diagrammatic view of a bicycle incorporating our control system for controlling the bicycle's motorized wheel hub.

Refer now to FIG. 1 of the drawings which shows a bicycle having a more or less standard frame 10 with upper and lower reach bars 12 and 14, a head post 16 mounted to the forward ends of the reach bars and a front fork 18 rotatably mounted to head post 16, the front fork being rotated by handlebars 22. A front wheel 24 is rotatably mounted between the tines of the front fork 18.

The upper and lower reach bars 12 and 14 extend back to a seat post 28, with the lower end of the seat post and the lower reach bar joining at a sprocket tube 32 which rotatably supports a plural-gear pedal sprocket 34. Extending rearwardly from the sprocket tube 32 is a rear fork 36 which, along with a bifurcated rear brace 38, rotatably supports a rear wheel 42. Wheel 42 includes a rim 42a and spokes 42b which extend to a motorized hub assembly 44 mounted to the rear end of rear fork 36. In the bicycle depicted in FIG. 1, the hub assembly 44 includes a one-way, ratchet-driven, free-wheeling rear sprocket 46 which is connected by a chain 48 to the plural-gear pedal sprocket 34. Assembly 44 is preferably the type described in the above patent incorporated herein by reference.

A power unit 49 comprising an electronic controller 50 which may be sandwiched between a pair of batteries 51 is supported on a rack 52 extending rearwardly from seat post 28 over the rear wheel 42. That rack may be braced by a pair of struts 52a extending down to opposite ends of the rear axle of the bicycle. Controller 50 is connected by an electrical power cable 53a and a connector 53aa to hub assembly 44, and via a signal cable 53b to a combination electronic throttle/brake control 54 mounted near the hand grip 22a of one of the handlebars 22 and to be described in more detail presently. Control 54 may be actuated in a throttle mode to cause the controller 50 to drive hub assembly 44 so the vehicle is propelled in the forward direction or the control may be actuated in a braking mode to cause the controller to control hub assembly 44 so that the assembly 44 functions as a regenerative brake for slowing or stopping the bicycle.

Thus, the bicycle in FIG. 1 can be powered by the rider pedaling on crank 34 assisted or not by the motorized rear wheel hub assembly 44. The details of that assembly 44 are described in the above-identified patent. Suffice it to say here that the hub assembly incorporates a modular, brushless, sensorless, 8-pole, 18 slot, 3-phase electric motor 44a (FIG. 9) which can rotate rear wheel 42 so as to either accelerate or decelerate the bicycle, in conjunction with the pedal chain drive.

The purpose of the control system specifically described herein is to control the acceleration and braking of the FIG. 1 bicycle with an eye to local regulations. For example, in some locales, it is required by ordinance that the motor cannot be powered until and unless the rider is pedaling the bicycle so that the bike is in motion. To facilitate such control, the controller is designed to respond to regenerative signals from the hub assembly so that it will not allow the hub assembly to produce motoring torque unless the wheel associated with that assembly is already rotating at a selected speed. Thus, the torque command or control signal from the throttle/brake control 54 on cable 53b and the signals from the motorized hub assembly 44 on cable 53a, enable controller 50 to properly control the operation of the bicycle as will be described. A unique characteristic of this sensorless motor and its electronic controller is that it requires the rider and vehicle interacting with the controller in order to continuously power the motor, making it practically impossible for this vehicle to take off on its own.

Refer now to FIGS. 2 to 5 which show the throttle/brake control 54 in greater detail. The control comprises a bearing element 62 in the form of a large bushing which fits snugly around one of the handlebars 22 adjacent to the hand grip 22a for that handlebar. The bearing element 62 has a radial flange 62a which faces away from grip 22a and preferably the bearing element is made of a strong, weather-resistant plastic material such as nylon. Aside from the large axial opening 63 which is sized to receive handlebar 22, the bearing element has a small longitudinal through hole 64 for receiving cable 53b. Also, longitudinal screw holes 65 are provided opposite sides of the opening 63. For reasons to be described later, bearing element 62 is provided with a circumferential concave inner edge 66. Finally, in order to releaseably secure bearing element 62 to handlebar 22, it is provided with a radial threaded hole 68 for receiving a set screw 72.

Figure 5:
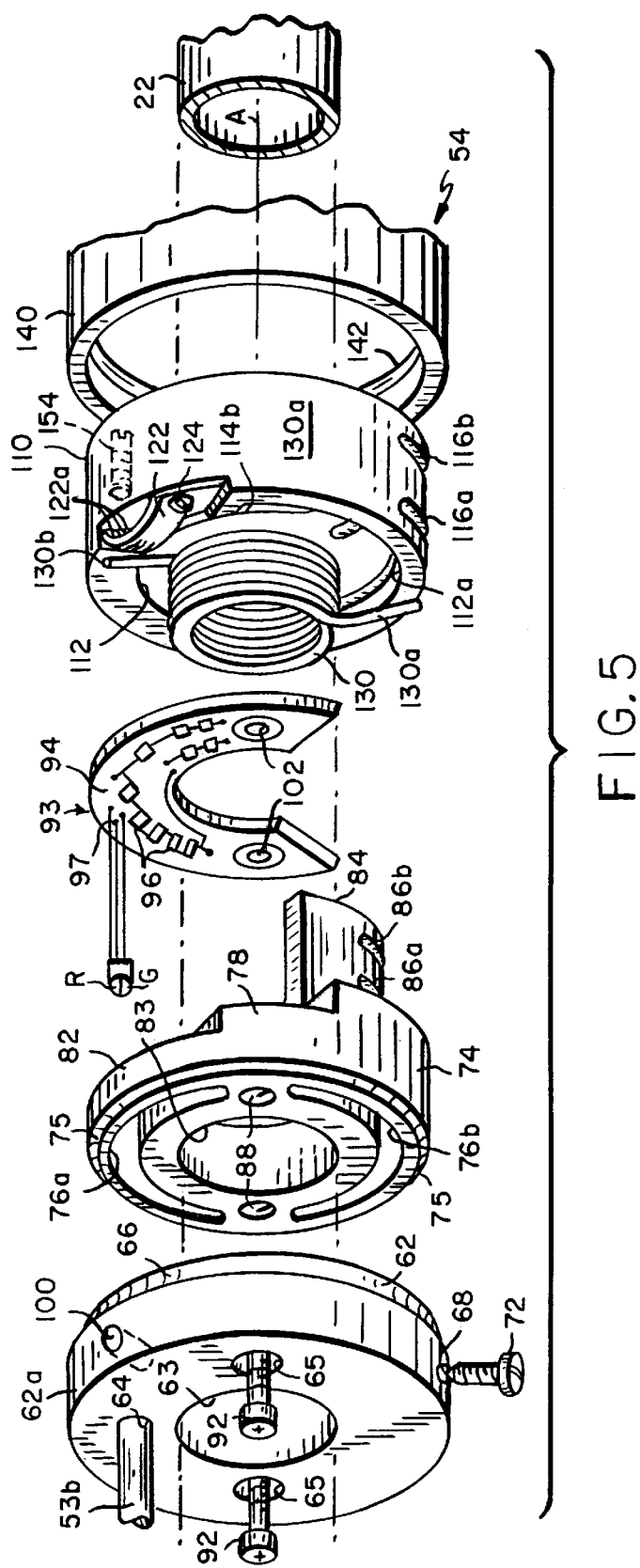
FIG. 5 is an exploded isometric view showing portions of the FIG. 2 control in greater detail.

Positioned adjacent to the edge 66 of bearing element 62 is an annular printed circuit support 74 which has an axial opening 83 for receiving handlebar 22. The edge 75 opposite bearing element 62 is concave and matches the curvature of edge 66 on the bearing element. Support 74 is also formed with diametrically opposite arcute cutouts or slots 76a and 76b for reducing the weight of, and material in, support 74. As best seen in FIG. 5, support 74 is axially stepped to form a flat support surface 78 for a printed circuit board to be described presently. Surface 78 occupies a sector of about 300° on support 74. Another step along support 74 provides a relieved surface 82 to provide clearance for elements on the printed circuit board to be described.

Extending axially from support 74 on the side thereof opposite bearing element 62 is an arcute tongue 84 having cylindrical curvature. Present in tongue 84 is a pair of parallel lateral slots 86a and 86b. These slots also have cylindrical curvature and an arc length of about 60°.

Figure 2:
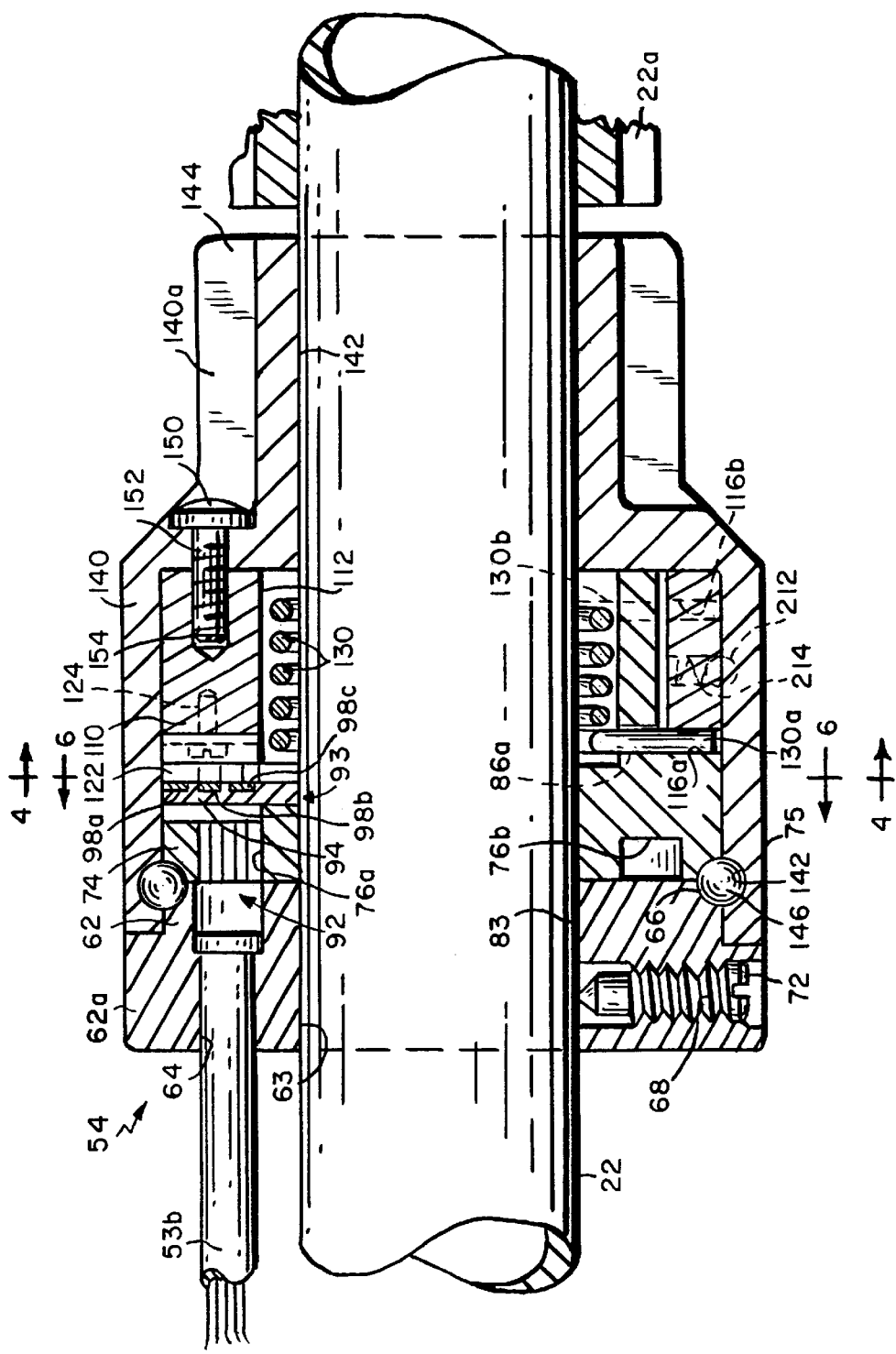
FIG. 2 is a longitudinal sectional view on a much larger scale showing the throttle/brake control of the FIG. 1 system.

Extending longitudinally through support 74 at diametrically opposite locations thereon is a pair of threaded holes 88. When bearing element 62 and support 74 are placed in abutment as shown in FIG. 2, they may be releasably secured together by a pair of threaded fasteners 92 extending through the holes 65 in bearing element 62 and turned down into the threaded holes 88 in support 74. When those elements are secured together as shown in FIG. 2, the curved edges 66 and 75 of bearing element 62 and support 74, respectively, form one-half of a circular bearing race for reasons to be described later.

Figure 6:
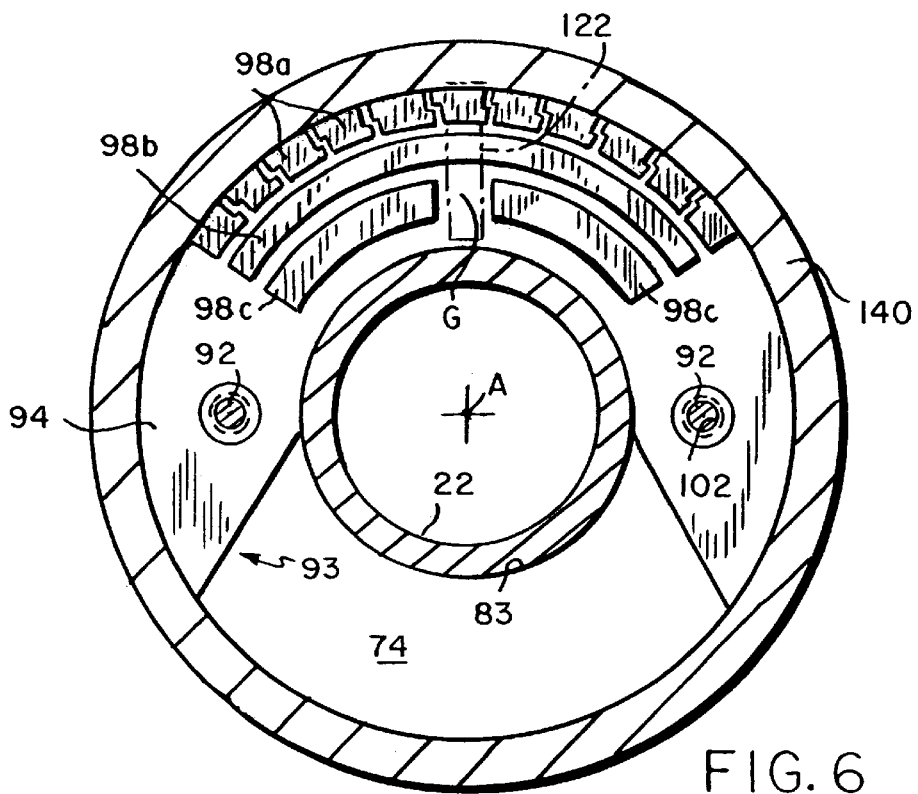
FIG. 6 is a sectional view taken along line 6—6 of FIG. 2.
Figure 7:
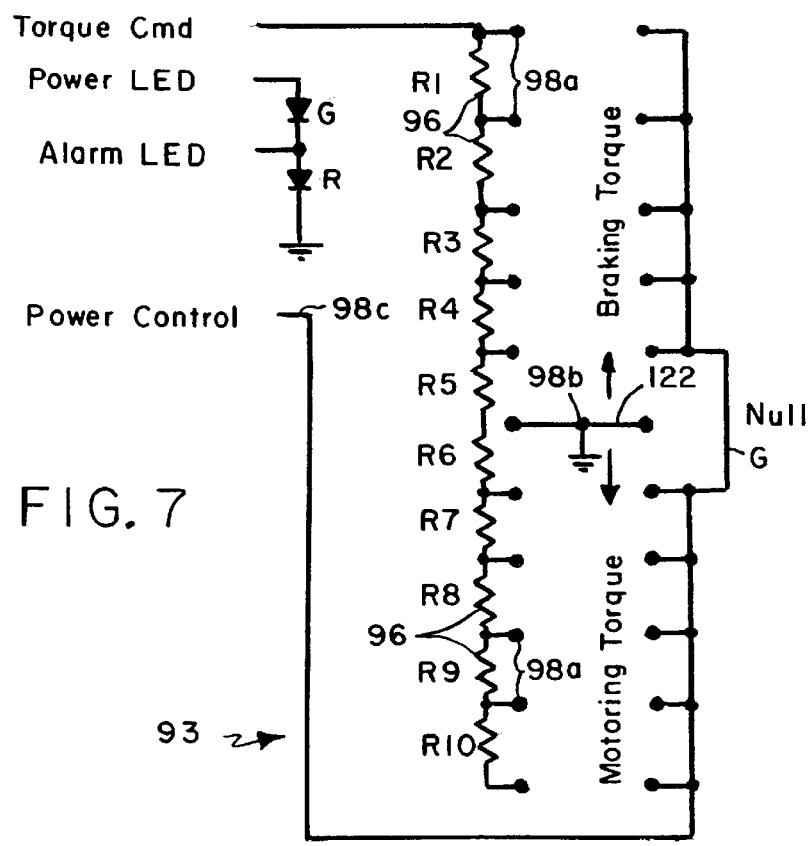
FIG. 7 is a schematic diagram showing a portion of the FIG. 2 control in detail.

Referring to FIGS. 2, 5 and 6, support 74 is designed to support a printed circuit-board shown generally at 93 composed of an insulating substrate 94 which carries on one face an array of resistors 96 which are electrically connected to each other and to a segmented contact track or slide 98a (FIG. 6) printed on the opposite face of the substrate so as to form the resistor ladder shown in FIG. 7. The circuit board 93 also includes a continuous ground track 98b and a split power control track 98c with a gap G in the middle. All of those tracks have circular curvature about an axis A (FIG. 6) which corresponds to the axis of the control 54 as a whole.

Preferably also, circuit board 93 supports, and delivers current to, a red LED R and a green LED G connected via long leads as shown in FIG. 5 so that the LEDs can be positioned within bearing element 62 when the control is assembled. A window 100 is provided in the side of that element so that the light from the LEDs is visible to the user. As will be seen, the LEDs provide useful status signals to the user. Formed near the ends of substrate 94 is a pair of diametrically opposite threaded holes 102 which are arranged and adapted to align with the holes 88 in support 74 when the printed circuit board 93 is seated on the support surface 78 of support 74. Thus, the fasteners 92 which secure support 74 to bearing element 62 also anchor the printed circuit board 93 to support 74. As noted previously, support 74 has a relieved surface 82 which provides clearance for the resistors 96 of the printed circuit board.

Figure 4:
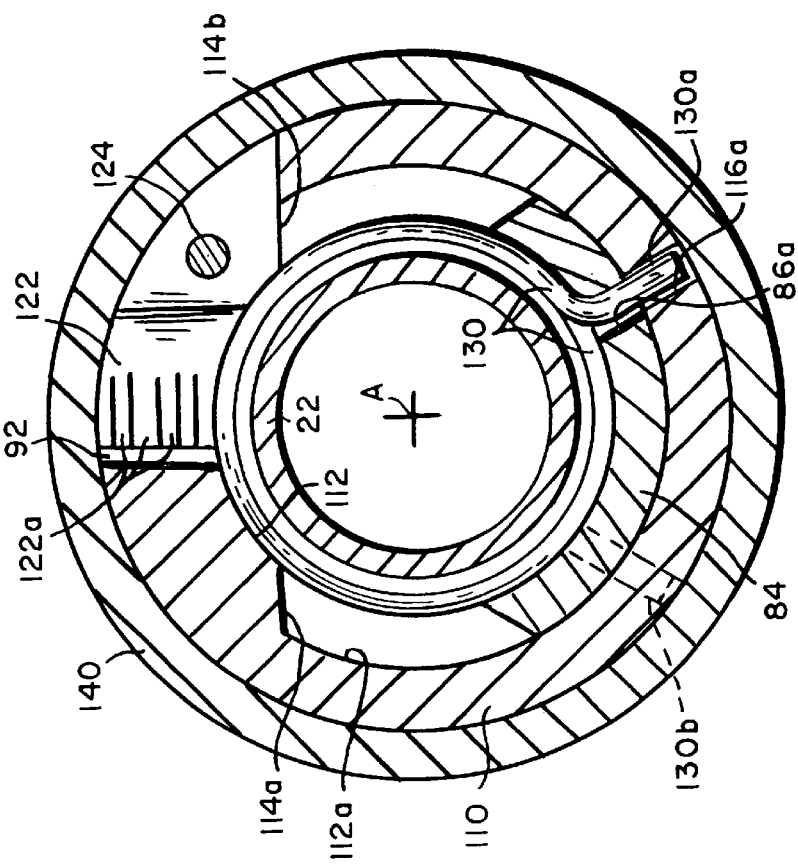
FIG. 4 is a sectional view taken along line 4—4 of FIG. 2.
Figure 3:
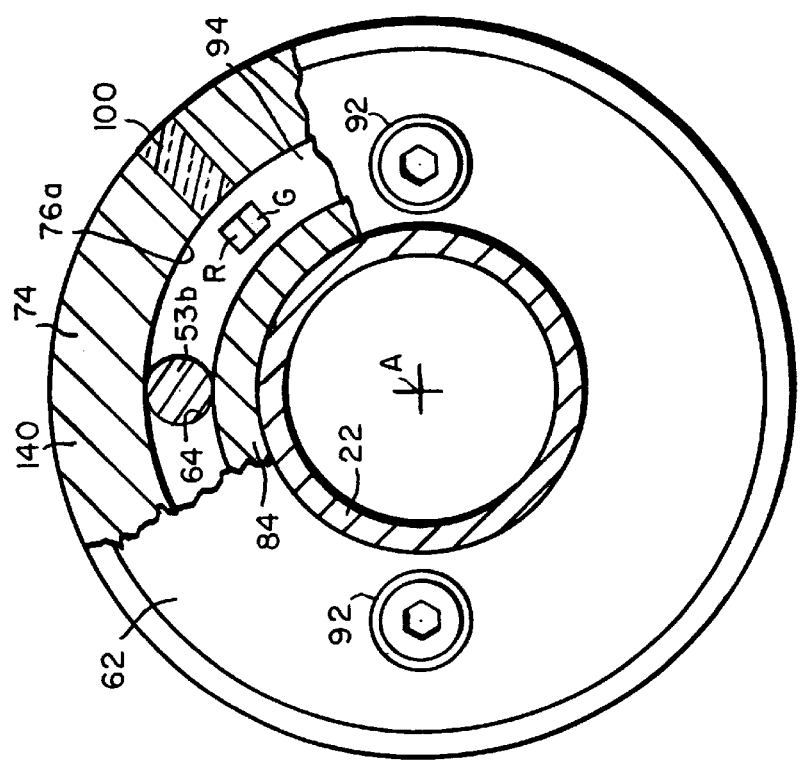
FIG. 3 is an end view with parts broken away thereof.

Referring to FIGS. 2, 4 and 5, the control 54 also includes an annular wiper bracket 110 having a relatively large axial through hole 112 for receiving handlebar 22. As best seen in FIG. 4, hole 112 has a dominant sector 112a which is enlarged to provide a pair of shoulder stops 114a and 114b which are located about 60° apart about the bracket axis. Also, a pair of parallel arcuate slots 116a and 116b are formed in the side wall of bracket 10. The slots occupy an angle of about 60° and are centered directly below the shoulder stops 114a, 114b in the bracket.

Secured to the end of bracket 110 facing circuit board 93 is a comb-like wiper 122 having a plurality of outwardly bowed teeth 122a. Wiper 122 is secured to the end of bracket 110 facing circuit board 93 by a suitable fastener 124 such as a screw or rivet. As will be described in detail later, the wiper 122 is preferably connected to electrical ground and arranged to slide along the contact tracks 98a to 98c depicted in FIG. 6.

As shown in FIGS. 2, 4 and 5, a coil torsion spring 130 is positioned inside bracket 110 so that the spring encircles handlebar 22 received in the bracket through hole 112. The spring 130 has opposite out-turned ends 130a and 130b, located on opposite sides of the spring, i.e. about 180° apart, when the spring is unstressed. When control 54 is assembled as shown in FIG. 2, the arcuate tongue 84 of support 74 projects into bracket 110 so that the slots 86a and 86b in that tongue are aligned with the slots 116a and 116b in bracket 110. Also, spring 130 sits inside bracket 110 and is wound up or pre-tensioned so that one spring end 130a extends through slots 86a and 116a and is captured at corresponding first ends of those slots, while the other spring end 130b extends through the slots 86b and 116b and is captured at corresponding second ends of those slots. Resultantly, the spring 130 biases bracket 110 relative to the circuit board support 74 and the circuit board 93 anchored thereto to a home position which locates the wiper 122 on bracket 110 more or less midway along the contact tracks 98a to 98c, i.e. opposite gap G depicted in FIG. 6. On the other hand, bracket 110 can be rotated in one direction or the other about axis A. The engagement of the side edges of the support tongue 84 against the shoulders 114a and 114b on bracket 110 limits the angular excursion of bracket 110 relative to support 174 in each direction about axis A to about 60°.

Referring to FIGS. 2 and 5, a sleeve-like throttle grip 140 encircles the bearing element 62, support 74 and bracket 110. The throttle grip has a reduced diameter neck 140a and an axial passage 142 which is sized to accept the handlebar 22. Preferably, the outer surface of neck 140a has grooves or knurls 144 to provide a gripping surface for the user. Also, as best seen in FIG. 2, the inside surface of the throttle grip 140 adjacent to the end thereof which engages around bearing element 62 is provided with a semicircular groove 142 which, when the control is assembled, lies directly opposite the curved surfaces 66 and 75 of bearing element 62 and support 74, respectively. All three curved surfaces combine to produce a circular race for an array of ball bearings 146. The bracket 110 may be secured to throttle grip 140 by means of a threaded fastener 150 extending through a lengthwise hole 152 in the throttle grip and turned down into a threaded hole 154 in the end of bracket 110.

When control 54 is engaged on handlebar 22 as shown in FIG. 2 and secured there by set screw 72, the bearing element 62 and support 74 as well as the circuit board 93 mounted thereto remain stationary. On the other hand, bracket 110 and the throttle grip 140 secured thereto by fastener 150 are free to rotate about the handlebar and axis A approximately 60° in either direction. Such motion in either direction is opposed by the spring 130 which tends to maintain throttle grip at a home or NULL position midway between those extremes which places the wiper 122 opposite gap G in power track 98c as shown in FIG. 6. In this NULL position of the throttle grip 140, the grounded wiper 122 is located in gap G on the resistor ladder in FIG. 7 and is thus disconnected from the power track 98c. Resultantly, as will become apparent, throttle/brake control 54 delivers no torque command to controller 50 (FIG. 1).

Figure 7A:
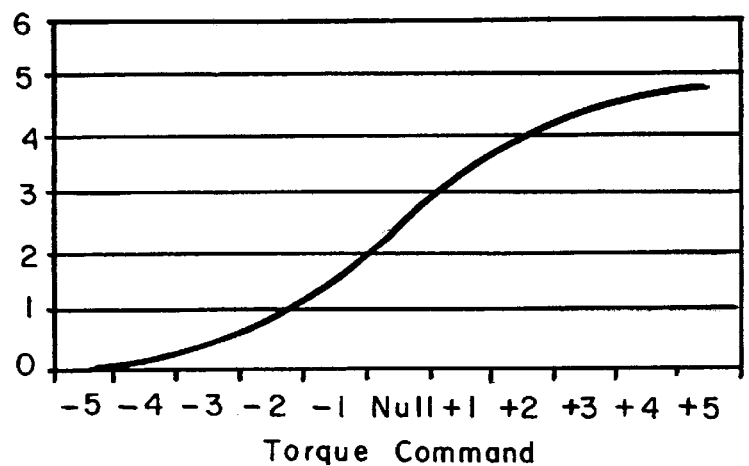
FIG. 7A is a graph illustrating the operation of the FIG. 2 control.

As seen from the above description, the control 54 is a wholly resistive device. The makeup of the resisters 96 and contact tracks 98a to 98c are shown in FIGS. 6 and 7, and FIG. 7A illustrates the output characteristics of the resister ladder in FIG. 7. The output voltage from the resistor ladder shown in FIG. 7 depends upon the position of wiper 122 along that ladder and constitutes the torque command from control 54 as a whole. That torque command may be generated from 5 volts DC, with 2.5 volts being zero torque and voltages less than 2.5 volts increasing braking torque and voltages greater than 2.5 volts increasing motoring torque. With a binary weighted resister ladder of the type shown in FIG. 7, the torque command has an "S" shape with the maximum slope at 2.5 volts as shown in FIG. 7A. This curve is the most responsive slope near the NULL position of the throttle grip 140. Other desired characteristics can be obtained simply by changing the resister weighting in the FIG. 7 ladder.

Also, it should be understood that the resistor ladder depicted in FIG. 7 and the segmented contact track 98a (FIG. 6) may be substituted for by a single continuous variable resistor track. If such a variable track is used, the resistive value of the track should be logarithmic to produce the same torque command vs. throttle position as the binary weighted resistors in FIG. 7. Such a continuous track has the additional advantage of producing infinitely variable torque commands instead of the quantized steps produced by the discrete resistor ladder of FIG. 7.

Figure 8:
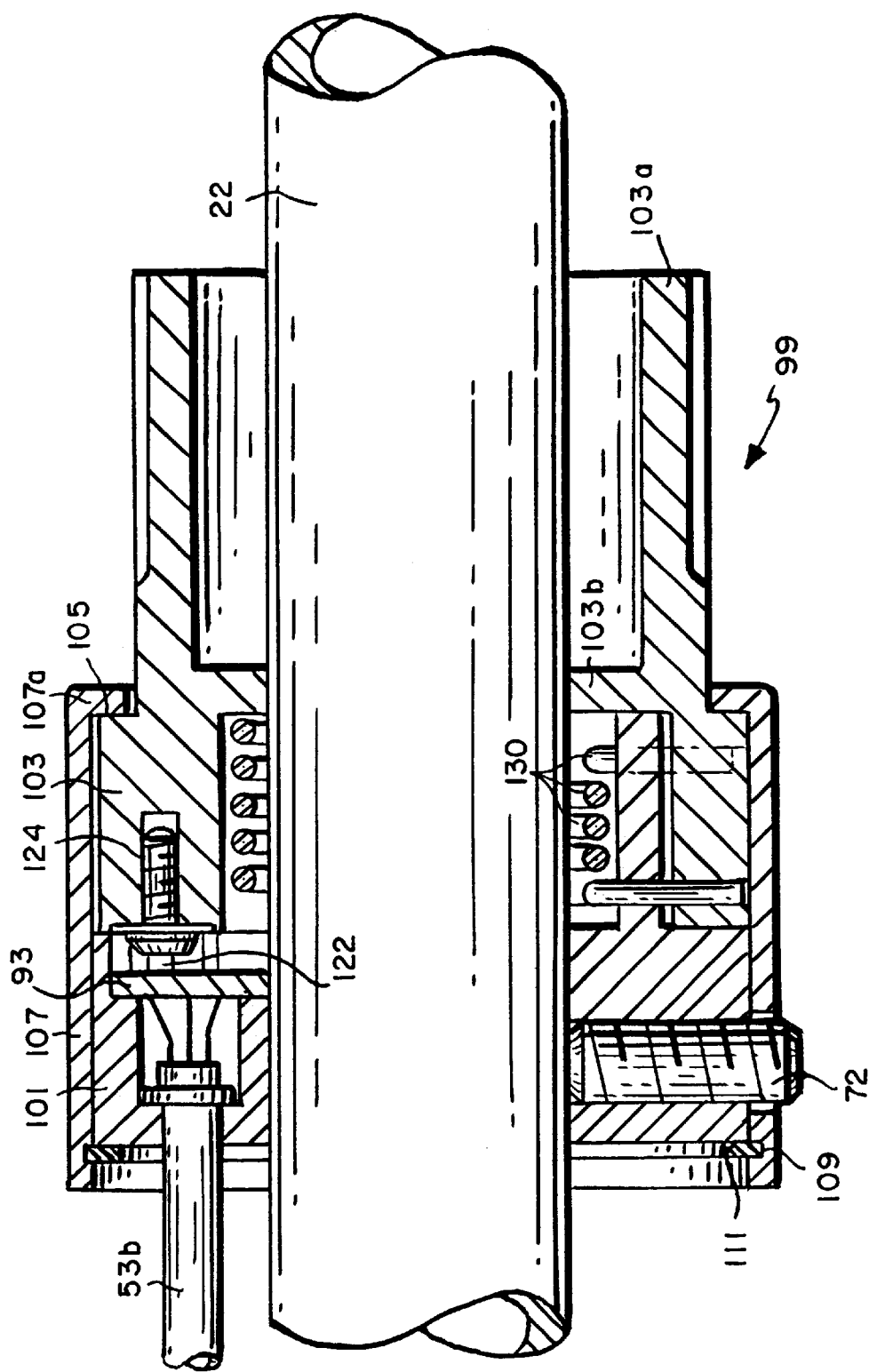
FIG. 8 is a view similar to FIG. 2 of another throttle/brake control for the FIG. 1 system.

Refer now to FIG. 8 which shows generally at 99 a slightly different throttle/brake control which operates in the same way as control 54 in FIG. 2 but has fewer parts and thus is less expensive to make. The parts that are the same as those in control 54 carry the same numeric identifiers. Basically, the FIG. 8 control 99 combines certain parts of control 54. More particularly, the bearing element 62 and circuit support 74 of control 54 are combined to form a single unit, to wit an end cap 101. Circuit board 93 is mounted to the inner face of end cap 101 with the components thereof connecting to cable 53b which extends through the end cap.

In a similar manner, the bracket 110 and throttle grip 140 of control 54 are combined into a single unit, namely a throttle grip 103 having a reduced diameter neck 103a forming an annular shoulder 105. The wiper 122 is mounted to the interior face of grip 103 opposite the contact tracks 98a to 98c of circuit board 93 as with the control 54 in FIG. 2. Also, spring 130 is coiled up within member 103.

In the FIG. 8 control 99, the end cap 101 and the throttle grip 103 are rotatably coupled together by a tubular cover 107 having an internal end flange 107a which engages shoulder 105. Cover 107 extends slightly beyond end cap 101 and a groove 109 is provided in the interior edge margin of the cover just beyond the end of end cap 101 to accept a resilient locking ring 111. When ring 111 is seated in the groove, the cover 107 is locked in place while still allowing for relative rotation of throttle grip 103.

When end cap 101 is secured to handle bar 22 by set screw 72, throttle grip 103 may be rotated about the handlebar to produce the necessary motion of wiper 122 relative to circuit board 93 to achieve the objectives described above for control 54.

Note that the FIG. 8 control has no provision for ball bearings 146 (FIG. 2). Rather, the end cap 101 and the throttle grip 103 are of low friction plastic materials whose opposing surfaces slide readily relative to each other. Also, the interior surface of the throttle grip neck 103a is relieved along its length to minimize contact between the throttle grip and the handlebar 22 about which is rotated. In other words, only a relatively small annular portion 103b of the throttle grip contacts handlebar 22 as shown in FIG. 8.

Thus while the FIG. 8 contact achieves the same objectives as the control 54 in FIG. 2, it has only about one-third the number of parts.

Figure 9:
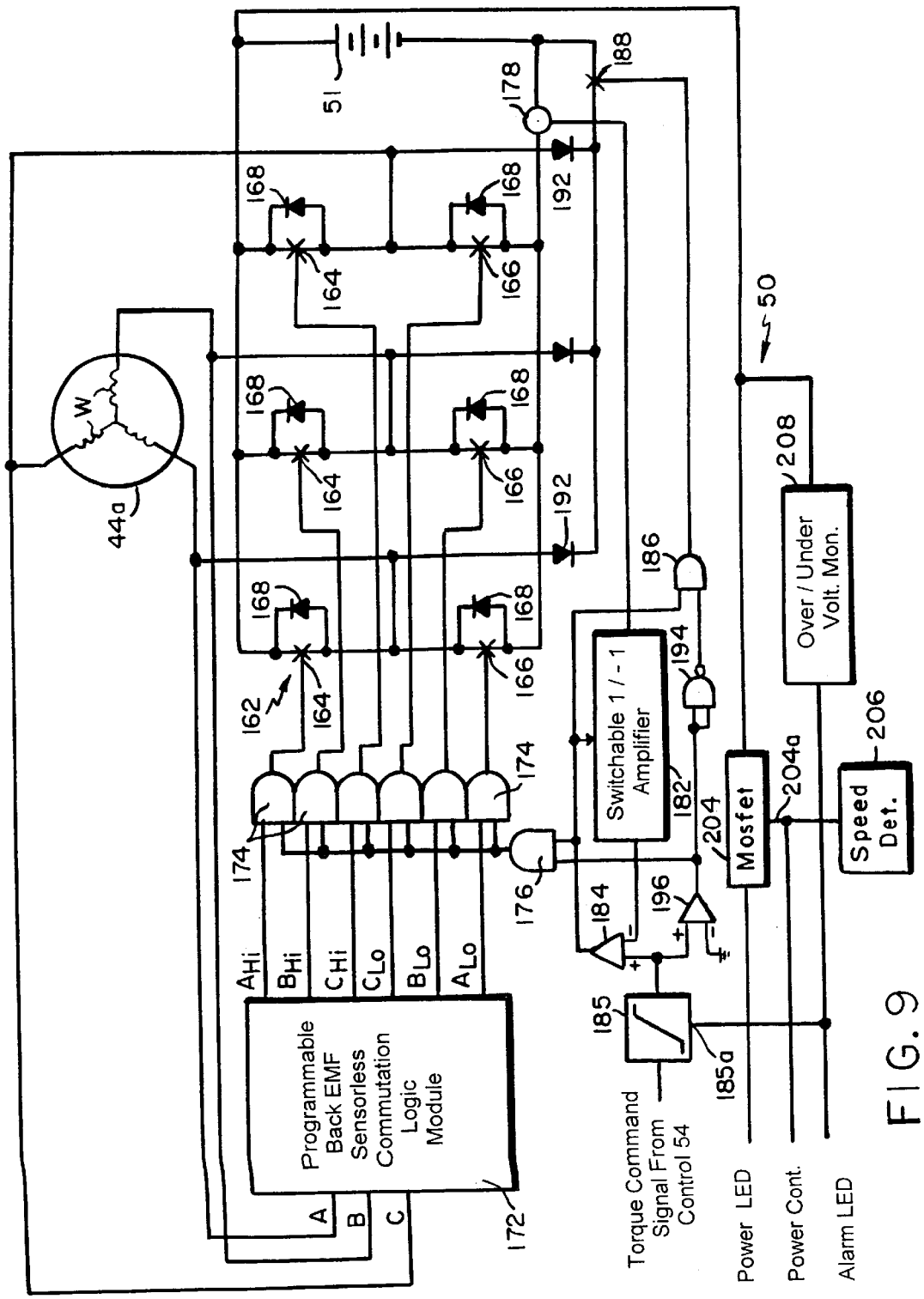
FIG. 9 is a block diagram showing the electronic components of our control system.

Refer now to FIG. 9 which shows controller 50 in greater detail. The controller comprises a commutation circuit in the form of an inverter shown generally at 162 which drives motor 44a. The inverter includes three high side or source switches 164 associated in the usual way with each of the three stator windings of motor 44a and three low side or sink switches 166 associated with those windings. In addition, however, an anti-parallel diode 168 is connected across each of those switches.

The operation of the switches 164, 166 to effect commutation is controlled by a programmable back EMF sensorless commutation logic module 172. This module receives current signals from the three stator windings of motor 42a and delivers commutation signals to the six switches 164, 166 by way of a bank of six AND gates 174 enabled by the output of a single gate 176.

Figure 11:
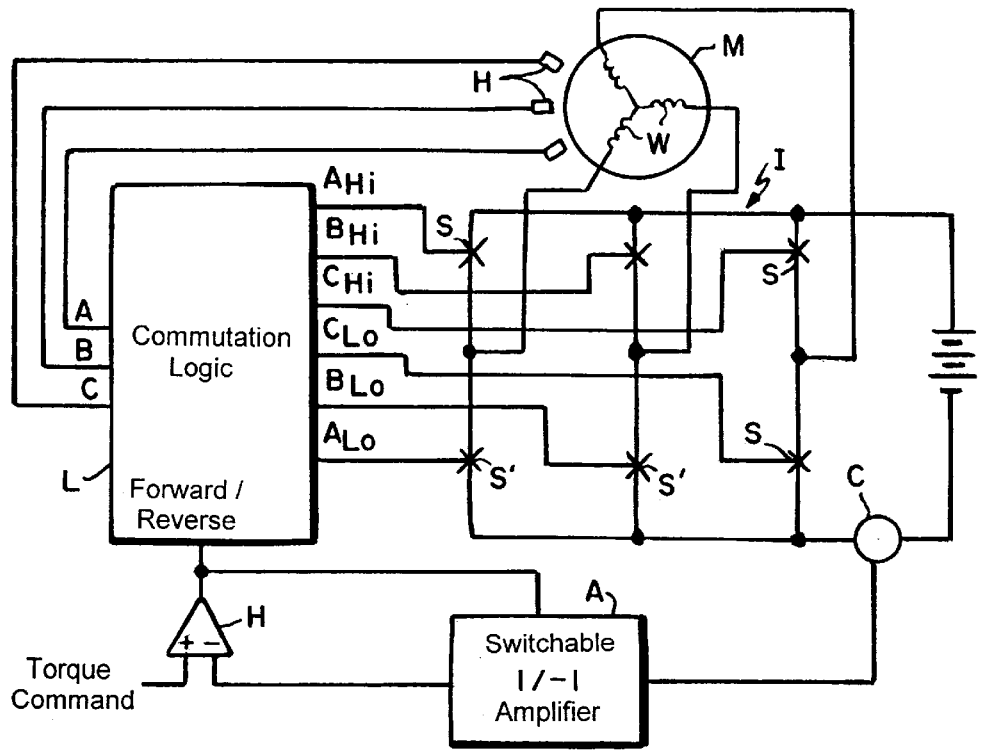
FIG. 11, already described, is a block diagram of a known control system for a brushless DC motor, and FIG. 12, already described, is a graph showing the operation of the FIG. 11 system.
Figure 12:
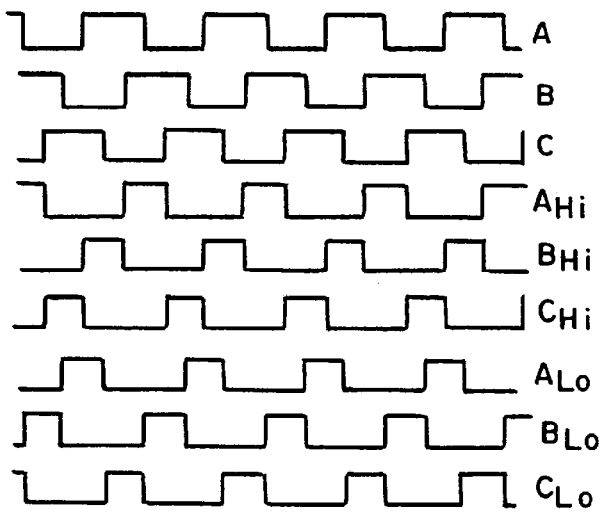

As with the known control circuit shown in FIG. 11, circuit 50 includes a current sensor 178 which senses source current from battery 51. The sensor output is applied via a switchable 1/−1 amplifier 182 to a hysteretic comparator 184 which also receives the torque command signal from control 54, via a torque limiting circuit 185. The output from comparator 184 is coupled to gate 176 and to amplifier 182 as well as to an AND gate 186 whose output controls the state of a so-called regeneration switch 188 connected between source 51 and the cathodes of three diodes 192 whose anodes are connected to the three windings of motor 44a. The torque command signal from circuit 185 is also applied to an amplifier 196 whose output indicates the sign of the torque command signal, i.e. either motoring (+) or braking (−). The output from amplifier 196 is fed to gate 176 and, via an inverting NAND gate 194, to gate 186.

Figure 10:
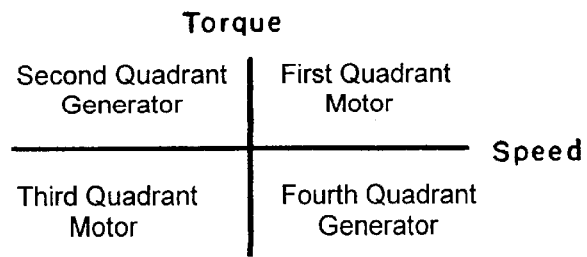
FIG. 10, already described, is a graph illustrating the operation of known DC brushless motors.

Controller 50 operates motor 44a in the first quadrant (FIG. 10) in a manner similar to the known circuit in FIG. 11. However, the inverse commutation period is produced by the natural commutation of the anti-parallel diodes 168 across switches 164, 166.

Thus, during the forward commutation period, the gates 174 are enabled and the switches 164, 166 are switched in the conventional manner as controlled by the sensorless comutation logic module 172. When the reverse commutation is called for by the hysteretic controller 184, the switches 164, 166 are all turned off, and the current flowing in the leakage inductance in the stator windings W causes the antiparallel diodes 168 across the switches 164, 166 of the reverse commutation sequence to conduct. The correct commutation is assured by the phasing of the back EMF and the natural commutation of the six diodes 168.

When the motor operates in the fourth quadrant, the required current build up in the stator inductance is produced by shorting out the stator windings for a period with a short circuit produced by switch 188 that is naturally commutated by the back EMF operating through a six-pulse rectifier consisting of the three anti-parallel diodes 168 across the high side switches 164, plus the three additional diodes 192 placed in series with the regeneration switch 188. When this short is released by switch 188, the current built up in the stator winding W inductance adds voltage to the back EMF producing a voltage that exceeds the DC voltage, resulting in regenerative current flowing to the DC source 51.

The current build up in the stator inductance could be accomplished by turning on all three low side switches 166, as in the non-regenerative braking mode normally applied to a sensorless drive. However, this current will not flow through the current sensor 178 and thus cannot be controlled. The additional switch 188 in controller 50 produces a current flow from the stator through the current sensor 178 back to the stator. The diodes 168 steer this current from the winding with the most positive potential to the winding with the most negative potential. This commutation puts the current in the proper position to produce maximum braking torque. When the short is released by turning off switch 188, this current continues to flow in the same windings, only now the current is directed back to the source 51 through the anti-parallel diodes. The mechanical energy is thus transferred to the battery 51 and regenerative braking is produced.

Still referring to FIG. 9, as alluded to above, the throttle/brake control 54 controls the power to controller 50 and displays via the LEDs R & G, the state of the control system. More particularly, the power control signal at contact or track 98c of circuit board 93 (FIG. 7) is used to drive the gate 204a of a switch which may be a P-channel MOSFET 204 which couples power from battery 51 to the power LED lead of circuit board 93 in FIG. 7. When the control's throttle grip wiper 122 is in gap G shown in FIG. 7, contact 98c is not connected to ground via track 98b. Therefore, there is no enabling signal applied to the gate 204a of the MOSFET 204. Consequently, contacts 98a of circuit 93 are not grounded via contact track 98b and there is no torque command signal delivered to controller 50. However, when the throttle grip 140 (or 103, FIG. 8) is rotated at least 6° from its NULL or home position, the circuit board 93 connects the power control lead to ground via contact track 98b thereby grounding the gate electrode 204a. This causes MOSFET 204 to the deliver power from battery 51 to controller 50 via the power LED lead of circuit board 93 (FIG. 7). Thus, movement of throttle grip 140 in the motoring direction provides a signal to controller 50 to cause motor 44a to generate motoring torque in an amount proportioned to the angular displacement of grip 140 from its NULL position.

Controller 50 also includes a speed detector 206 which monitors the frequency of the voltage being applied to motor 44a which frequency is proportional to the speed of the motor. The output of detector 206 is also applied to the gate 204a of MOSFET 204. When the detector determines that the FIG. 1 bike is moving at a sufficient speed to allow motoring, e.g. 6–8 MPH, it grounds the MOSFET gate electrode 204a causing the MOSFET to conduct. Thus, the MOSFET maintains power to the controller 50 when the bicycle is moving above the threshold speed, but interrupts power to the controller when the bicycle is stopped and no torque is commanded by the throttle/brake control 54. In this way, the controller 50 will not produce any motoring torque when the bicycle is moving below the threshold speed so the bicycle must be pedaled in order to start motoring. The output of speed detector 206, besides allowing torque, will also engage the MOSFET so that while the bike is moving, power to controller 50 will not be shut off even if throttle grip 140 is returned to the NULL position and the bike is coasting.

Rotation of the throttle grip 140 in the opposite or braking direction will produce a signal from control 54 that will cause controller 50 to command motor 44*a* to produce a regenerative braking torque in an output proportional to the angular position of the throttle grip. If grip 140 is returned to its NULL position and the motor speed falls below the selected threshold of detector 206, MOSFET 204 will cut off power to the controller 50.

When power is coupled to the controller by MOSFET 204, it is also applied to the power LED G in control 54 (FIGS. 3 and 5) which thereupon displays a green light to signal that condition.

As shown in FIG. 9, controller 50 also incorporates a voltage monitoring circuit 208 connected to battery 51. If the battery voltage falls too low indicating a discharge condition, or if that voltage rises too high indicating an overcharged condition, monitor circuit 208 will apply a corresponding signal to the control input 185*a* of torque limiting circuit 185. Thereupon, circuit 185 will reduce the torque command signal from circuit board 93 (FIG. 7) by a selected amount, e.g. one half, thereby reducing the torque commanded by control 54 by the same amount. This will limit the rate of discharge of battery 51 if the system is in its motoring mode of operation, and the rate of battery charge if the system is in its generating mode. Preferably, monitor 208 has sufficient hysteresis to prevent undesirable oscillation of its output signal to circuit 185.

The output of voltage monitoring circuit 208 is also applied to the alarm LED R (FIGS. 3 and 5) in control 54 which will thereupon emit a red light to alert the operator to the condition and to explain why there has been a reduction in the driving torque delivered by the system.

We should mention that when power is being delivered to controller 50, only the power LED G in FIG. 7 is illuminated because the output of monitor 208 powering alarm LED R in FIG. 7 is essentially at ground, i.e. LED R is short circuited, unless there is a torque limiting condition as described above.

It will thus be seen that the objects set forth above, among those made apparent from the preceding description, are efficiently attained. Also, certain changes may be made in the above construction without departing from the scope of the invention. For example, as shown in phantom in FIG. 2, a spring-loaded ball 212 may be recessed into the side of bracket 110 which can seat in a circular array of recesses 214 formed on the inside wall of throttle grip 140 to register discrete positive and negative torque command positions and the home position of the throttle grip 140. Therefore, it is intended that all matter contained in the above description or shown in the accompanying drawings shall be interpreted as illustrative and not at a limiting sense.

It is also to be understood that the following claims are intended to cover all of the generic and specific features of the invention described herein.

What is claimed is:

1. A motor-drive circuit that includes a plurality of drive terminals adapted for coupling to respective phase terminals of a polyphase DC machine, the motor-drive circuit comprising:

a DC source having positive and negative source electrodes;

a separate source current path associated with each drive terminal and extending between that drive terminal and the positive source electrode;

a separate sink current path associated with each drive terminal and extending between that drive terminal and the negative source electrode;

a separate source switch associated with and interposed in each source current path and operable by application of switch-control signals thereto to switch between an open state, in which it prevents current flow through that source current path, and a closed state, in which it permits current flow therethrough;

a separate sink switch associated with and interposed in each sink current path and operable by application of switch-control signals thereto to switch between an open state, in which it prevents current flow through that sink current path, and a closed state, in which it permits current flow therethrough;

a separate source shunt unidirectional device associated with each source switch and so connected and oriented as, when that source switch is open, to shunt current around the associated source switch in the direction toward the positive source electrode but not in the direction away from it;

a separate sink shunt unidirectional device associated with each sink switch and so connected and oriented as, when that sink switch is open, to shunt current around the associated sink switch in the direction away from the negative source electrode but not in the direction toward it, all source or all sink shunt unidirectional devices also being denominated shorting-path shunt unidirectional devices;

a separate shorting electrical path associated with each drive terminal and extending therefrom to the other drive terminals through the shorting-path shunt unidirectional devices associated with those other drive terminals;

a separate shorting unidirectional device so interposed and oriented in each shorting electrical path as to permit current flow therethrough only in the direction from the drive terminal with which it is associated to each other drive terminal;

a shorting switch interposed in each shorting electrical path and operable by switch-control signals applied thereto between a closed state, in which it permits current flow therethrough, and an open state, in which it prevents current flow therethrough, and a control circuit that, when the drive terminals are coupled to respective phase terminals of a polyphase DC machine having a rotor rotating at least at a minimum speed and stator windings terminating in the phase terminals, is operable:

in a motor mode, in which it applies:

to each shorting switch, switch-control signals that keep each shorting switch open, and to the source and sink switches, switch-control signals that open and close the source and sink switches in such a phase relationship with the rotor's rotation as to make the stator windings cause magnetic fields that drive the rotor in its direction of motion, and in a generator mode, in which it applies:

to each source and sink switch, switch-control signals that keep that source or sink switch open, and to each shorting switch, switch-control signals that keep that shorting switch closed during portions of the rotor's cycle that start when the current flowing in the source and sink current paths is relatively low and open during portions of a rotor's cycle that start when the current flowing in the source and sink current paths is relatively high.

2. A motor-drive circuit as defined in claim 1 wherein the shorting-path shunt unidirectional devices are the sink shunt unidirectional devices.

3. A motor-drive circuit as defined in claim 1 further including a common shorting-path segment included in every shorting electrical path.

4. A motor-drive circuit as defined in claim 3 wherein every shorting switch is the same, common shorting switch, which is interposed in the common shorting-path segment.

5. A motor-drive circuit as defined in claim 3 wherein:
the motor-drive circuit further includes a current sensor that generates a current-sensor output indicative of the current flowing through the drive terminals, and
the control circuit is responsive to the current-sensor output in applying switch-control signals to each shorting switch.

6. A motor-drive circuit as defined in claim 5 wherein the current sensor is interposed in the common shorting-path segment.

7. A motor-drive circuit as defined in claim 3 wherein the negative source electrode is coupled into the common shorting-path segment.

8. A motor-drive circuit as defined in claim 1 wherein:
the motor-drive circuit further includes a current sensor that generates a current-sensor output indicative of the current flowing through the drive terminals, and
the control circuit is responsive to the current-sensor output in applying switch-control signals to each shorting switch.

9. A motor-drive circuit as defined in claim 8 wherein the control circuit, when it is in its generator mode, establishes first and second hysteresis thresholds representing respective current values and so applies switch-control signals to each shorting switch as thereby to:
open the shorting switch when the magnitude of the current represented by the current-sensor output rises from below that represented by the first hysteresis threshold to above that represented by the second hysteresis threshold, and
close the shorting switch when the magnitude of the current represented by the current-sensor output falls from above the second hysteresis threshold to below the first hysteresis threshold.

10. A motor-drive circuit as defined in claim 9 wherein the control circuit is responsive to a torque-command signal representing a torque value corresponding to a stator-current value to assign the hysteresis thresholds values that define a hysteresis range containing the stator-current value.

11. A motor-drive circuit as defined in claim 8 wherein the control circuit includes:

a commutation circuit that generates, for respective source and sink switches, commutation signals whose values indicate which states of the source and sink switches are in such a phase relationship with the rotor's rotation as to make the stator windings cause magnetic fields that drive the rotor in its direction of rotation;

gates that receive respective ones of the commutation signals and are responsive to a gating signal to generate, as respective ones of the switch-control signals, output signals that open the source and sink signals when the gating signal has a first, disabling value but are determined by the respective commutation signals when the gating signal has a second, enabling value, and a gating-signal generator, responsive to the current-sensor output and a torque-command signal that assumes values that extend from a motor range through a generator range, that generates the gating signal, to which it gives:

the disabling value when the torque-command signal assumes a value in its generator range, and one of the enabling value and the disabling value selected in accordance with a comparison of the current-sensor output and the torque-command signal when the torque-command signal assumes a value in its motor range.

12. A motor-drive circuit as defined in claim 11 wherein the control circuit, when it is in its generator mode, establishes first and second hysteresis thresholds representing respective current values and so applies switch-control signals to each shorting switch as thereby to:
open the shorting switch when the magnitude of the current represented by the current-sensor output rises from below that represented by the first hysteresis threshold to above that represented by the second hysteresis threshold, and
close the shorting switch when the magnitude of the current represented by the current-sensor output falls from above the second hysteresis threshold to below the first hysteresis threshold.

13. A motor-drive circuit as defined in claim 12 wherein the control circuit is responsive to a torque-command signal representing a torque value corresponding to a stator-current value to assign the hysteresis threshold values that define a hysteresis range containing the stator-current value.

14. A motor drive circuit as defined in claim 1 and further including a polyphase DC machine connected to said drive terminals.

* * * * *